United States Patent
Toaso, Jr. et al.

(10) Patent No.: US 9,909,660 B2
(45) Date of Patent: Mar. 6, 2018

(54) VEHICLE POWER TRANSFER UNIT (PTU) WITH OIL FEED PASSAGE

(71) Applicant: GKN Driveline North America, Inc., Auburn Hills, MI (US)

(72) Inventors: Robert Toaso, Jr., Livonia, MI (US); Austin Gerding, Shelby Township, MI (US); Les Heeren, Chesterfield, MI (US); Tony Arden, Davisburg, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 17 days.

(21) Appl. No.: 15/104,086

(22) PCT Filed: Jan. 9, 2015

(86) PCT No.: PCT/US2015/010834
§ 371 (c)(1),
(2) Date: Jun. 13, 2016

(87) PCT Pub. No.: WO2015/106111
PCT Pub. Date: Jul. 16, 2015

(65) Prior Publication Data
US 2017/0051822 A1 Feb. 23, 2017

Related U.S. Application Data

(60) Provisional application No. 61/925,701, filed on Jan. 10, 2014.

(51) Int. Cl.
*F16H 57/04* (2010.01)
*B60K 17/344* (2006.01)
*F16H 57/02* (2012.01)

(52) U.S. Cl.
CPC ....... *F16H 57/0424* (2013.01); *B60K 17/344* (2013.01); *F16H 57/02* (2013.01);
(Continued)

(58) Field of Classification Search
CPC .... F16H 57/04; F16H 57/042; F16H 57/0421; F16H 57/0423; F16H 57/0424;
(Continued)

(56) References Cited

U.S. PATENT DOCUMENTS 2,240,118 A * 4/1941 Matthews ............. F16C 19/386
184/11.1
2,368,963 A * 2/1945 Boden .................. F16C 19/548
114/20.1

(Continued)

FOREIGN PATENT DOCUMENTS

DE 151212 A1 10/1981
DE 102012207134 A1 10/2013
WO WO-2017083658 A1 * 5/2017 ........... F16H 7/0424

OTHER PUBLICATIONS

Machine translation of DD 151212 A1 obtained on Dec. 22, 2017.*
(Continued)

*Primary Examiner* — Adam D Rogers
(74) *Attorney, Agent, or Firm* — Jennifer M Brumbaugh; Reising Ethington P.C.

(57) ABSTRACT

One implementation of a vehicle power transfer unit (PTU) housing, such as that for an automobile, has an oil feed passage extending through one of its walls and at its interior. The oil feed passage delivers oil to gears, bearings, and/or other components equipped inside of the PTU housing and suspended above an oil bath in the PTU housing. Oil of the oil bath is thrown about by rotating gears and makes its way through the oil feed passage and to the gears, bearings, and/or other components. With the oil feed passage, the PTU housing does not rely solely on oil sloshing and splashing and being slung around inside of the PTU housing as the technique for getting oil to the gears, bearings, and/or other components.

18 Claims, 3 Drawing Sheets

(52) U.S. Cl.
CPC ..... *F16H 57/0423* (2013.01); *F16H 57/0457* (2013.01); *F16H 57/0471* (2013.01); *F16H 57/0453* (2013.01)

(58) Field of Classification Search
CPC ............. F16H 57/0426; F16H 57/0445; F16H 57/0453; F16H 57/0457; F16H 57/0469; F16H 57/0471; F16H 57/0479; F16H 57/02; B60K 17/344
See application file for complete search history.

(56) References Cited

U.S. PATENT DOCUMENTS

| | | | |
|---|---|---|---|
| 2,981,372 A * | 4/1961 | Naumer | F16H 57/04 184/6.12 |
| 4,319,499 A | 3/1982 | Sanui et al. | |
| 7,210,374 B2 | 5/2007 | Leimann | |
| 7,487,697 B2 | 2/2009 | Marla et al. | |
| 8,215,440 B2 * | 7/2012 | Hoffmann | B60K 23/0808 180/233 |
| 8,657,073 B2 | 2/2014 | Matsumoto et al. | |
| 8,684,876 B2 | 4/2014 | Corless et al. | |
| 8,845,473 B2 * | 9/2014 | Nett | F16H 57/0409 180/244 |
| 8,960,362 B2 * | 2/2015 | Barbir | B62D 21/186 180/378 |
| 9,303,696 B2 * | 4/2016 | Phelps | F16D 13/74 |
| 9,657,572 B2 * | 5/2017 | McCune | F01D 5/027 |
| 9,732,839 B2 * | 8/2017 | Sheridan | F16H 57/0424 |
| 2007/0006675 A1 | 1/2007 | Marla et al. | |
| 2009/0277711 A1 | 11/2009 | Hoffmann et al. | |
| 2012/0031727 A1 | 2/2012 | Nett et al. | |
| 2014/0231209 A1 | 8/2014 | Nett et al. | |
| 2014/0311268 A1 * | 10/2014 | Grosswald | F16H 57/0493 74/468 |
| 2017/0138460 A1 * | 5/2017 | Beque | F03D 80/70 |

OTHER PUBLICATIONS

Written Opinion & International Search Report for PCT/US2015/010834 dated May 1, 2015, 12 pages.
EP Extended Search Report for EP Application No. 15735054.7 dated Aug. 1, 2017 (11 pages).

* cited by examiner

VEHICLE POWER TRANSFER UNIT (PTU) WITH OIL FEED PASSAGE

REFERENCE TO RELATED APPLICATIONS

This application claims the benefit of U.S. Provisional Application Ser. No. 61/925,701 filed on Jan. 10, 2014, the entire contents of which are incorporated herein by reference.

TECHNICAL FIELD

The present disclosure relates generally to vehicle power transfer units (PTUs), and more particularly to techniques for supplying oil in interiors of vehicle PTUs.

BACKGROUND

In general, vehicle drivelines transmit torque from a vehicle's engine to its wheels. Automotive drivelines sometimes include power transfer units (PTUs, also known as power take-off units) for selectively distributing torque among shafts in the drivelines. The PTUs are often equipped in four-wheel and all-wheel drive driveline configurations. A power transfer unit typically consists of a housing that encloses and supports gear assemblies, shafts, and bearings, among other possible components. Oil is ordinarily kept in the housing to lubricate the gear assemblies as they rotate and mesh during operation of the driveline, and to lubricate the bearings and other components. The housing is typically filled with oil only partway and not fully, as oil usually makes its way to all of the components when it is sloshed and splashed and slung around in the housing during operation.

SUMMARY

In one implementation, a vehicle power transfer unit (PTU) housing includes one or more walls, an oil feed passage, and an oil feed lead-in formation. An interior is defined in part or more by the wall(s). The oil feed passage extends through the wall(s). The oil feed passage has an inlet open to the interior at a first location, and has an outlet open to the interior at a second location. The second location is situated above an oil resting plane of an oil bath that is held in the PTU housing. When a gear assembly in the interior is operated and rotates, oil from the oil bath is urged through the oil feed passage from its inlet and to its outlet and to the second location. The oil feed lead-in formation is set in the wall(s) and is located near the inlet. The oil feed lead-in formation is shaped and orientated relative to the oil resting plane in order to guide oil into the oil feed passage.

In another implementation, a vehicle power transfer unit (PTU) housing includes a main wall, an interior all, an interior, an oil feed passage, and an oil feed lead-in formation. The interior wall extends from the main wall. The interior has a first section in which an oil bath is held in the PTU housing, and has a second section that is situated above an oil resting plane of the oil bath. The first section is defined in part or more by an inner surface of the main wall, and the second section is defined in part or more by an inner surface of the interior wall. The oil feed passage extends through the interior wall. The oil feed passage has an inlet that is open to the first section and has an outlet that is open to the second section. The oil feed lead-in formation is set partly or more in the interior wall and near the inlet of the oil feed passage.

In yet another implementation, a vehicle power transfer unit (PTU) assembly includes housing, a gear assembly, and one or more bearings. The housing includes a main wall, an interior wall, a first interior section, a second interior section, an oil feed passage, and an oil feed lead-information. The interior wall extends from the main wall. The first interior section is defined in part or more by an inner surface of the main wall and holds an oil bath. The second interior section is defined in part or more by an inner surface of the interior wall and is situated outside of the oil bath. The oil feed passage can extend through the main wall, can extend through the interior wall, or can extend through both the main wall and the interior wall. The oil feed passage has an inlet that is open to the first interior section, and has an outlet that is open to the second interior section. The oil feed passage fluidly communicates the first interior section with the second interior section. The oil feed lead-in formation is set in the main wall, is set in the interior wall, or is set in both the main wall and the interior wall. The oil feed lead-in formation is located near the inlet of the oil feed passage. The oil feed lead-in formation has one or more curved surfaces and one or more planar surfaces spanning from the curved surface(s). The gear assembly is located at the first interior section. The bearing(s) is located at the second interior section. Amid operation of the gear assembly at the first interior section, oil of the oil bath impinges the oil feed lead-in formation and is urged through the oil feed passage from the inlet and to the outlet and to the bearing(s).

BRIEF DESCRIPTION OF THE DRAWINGS

The following detailed description of preferred embodiments and best mode will be set forth with reference to the accompanying drawings, in which.

DETAILED DESCRIPTION

Referring in more detail to the drawings, a power transfer (PTU) 10 of an automotive vehicle is designed to ensure that its gear assemblies, bearings, and other components are properly supplied with oil during operation. The PTU's oil is urged through an oil feed passage 12 and to a location suspended above the oil, and does not solely rely on oil sloshing and splashing and being slung around as the way to get oil to that location. With the oil feed passage 12, oil be effectively provided to components when the automotive vehicle is traveling at a lower speed than previously possible.

The PTU 10 can have different constructions and components depending on, among other factors, the configuration of the driveline in which the PTU is installed. In the example of the figures, the PTU 10 includes a housing 14, a first gear assembly 15, and a second gear assembly 16. Skilled artisans will appreciate that PTUs also conventionally include other components such as shafts scaled into and out of the PTUs, and include additional gear assemblies than those described here.

Figure 1:
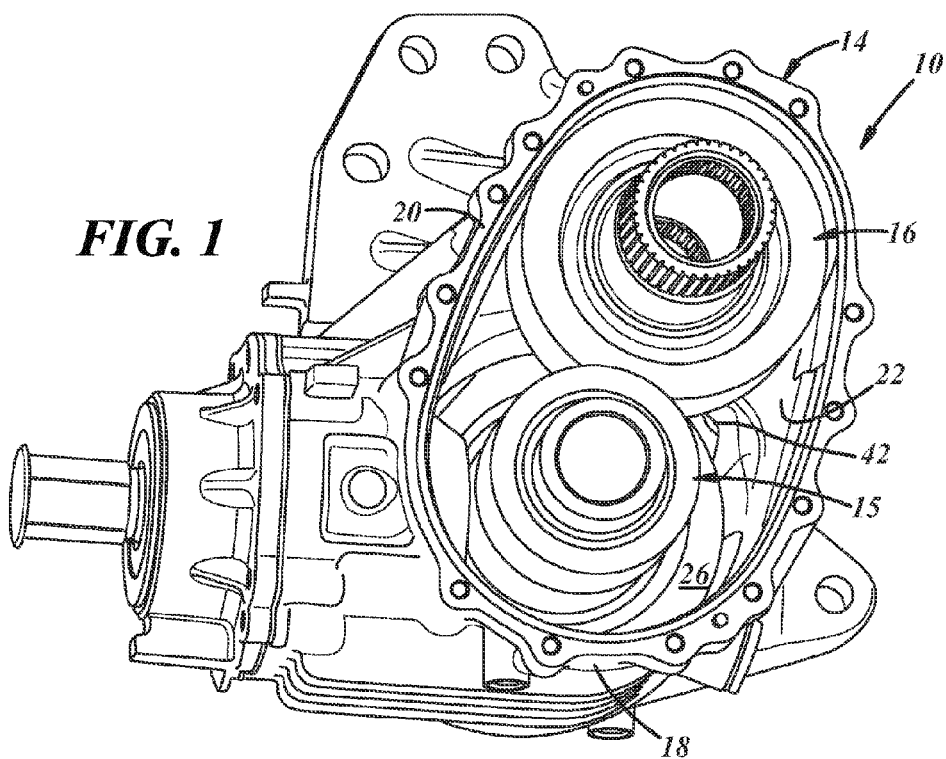
FIG. 1 is a perspective view of one part of an embodiment of a power transfer unit (PTU) housing.
Figure 2:
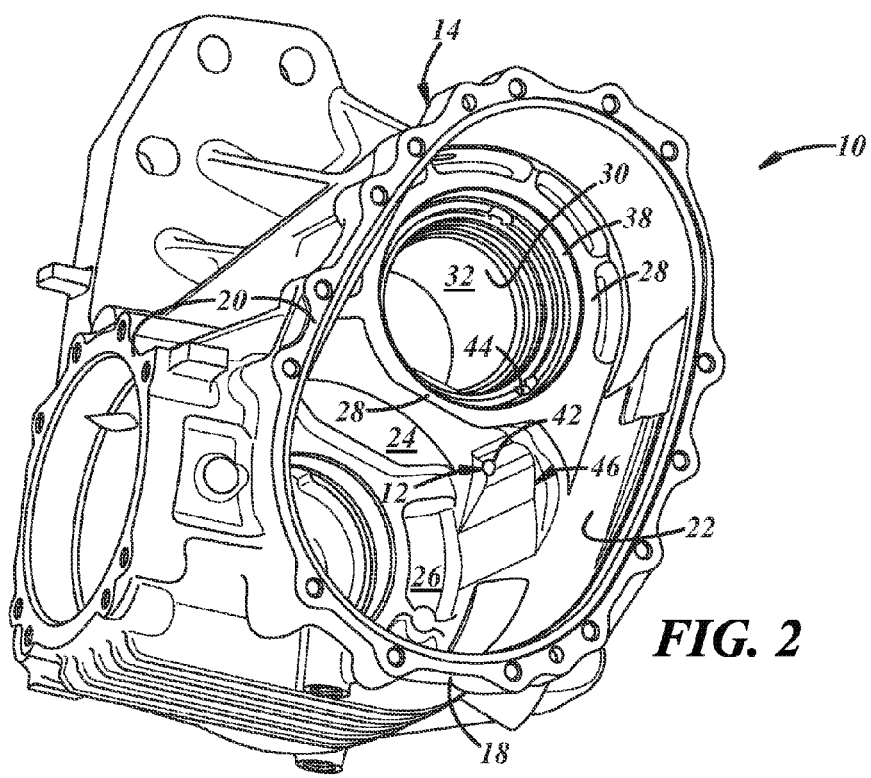
FIG. 2 is a perspective view of the PTU housing of FIG. 1, the PTU housing having internal components removed.

The housing 14 encloses and supports components of the PTU 10 such as the first and second gear assemblies 15, 16 and shafts. The exact construction of the housing 14 may depend on the configuration of the driveline and on the design of the gear assemblies and shafts. In the embodiment of the figures, and particularly referring to FIGS. 1 and 2, the housing 14 includes a set of halves that are bolted and sealed together—just one of the halves is shown. The housing 14 is conventionally composed of a metal material and can be manufactured via casting or another metalworking process. When installed in the driveline, the housing 14 is oriented similarly as depicted in FIGS. 1 and 2 with its bottom 18 closest to the ground underneath the associate vehicle. A main wall 20 frames the housing 14 and has openings in it for accommodating components of the PTU 10 like input and output shafts. The main wall 20 has an inner surface 22 that partly defines an interior 24. Since only one-half of the housing 14 is shown, the figures do not necessarily illustrate all of the interior 24. The interior 24 is the space inside the housing 14 where the gear assemblies are placed and where oil is held. The interior 24 has a first section 26 that provides room for the first gear assembly 15 and that serves as a reservoir for holding an oil bath that lubricates the gear assemblies, bearings, and other components in the PTU 10. Oil of the oil bath is filled in the first section 26 to an oil line A shown in FIG. 4. Here, the oil bath does not completely fill the interior 24. When inactive and not sloshed about, an upper surface of the oil bath constitutes an oil resting plane generally aligned with the oil line A and spanning horizontally (with respect to FIG. 1) across the interior 24.

Figure 4:
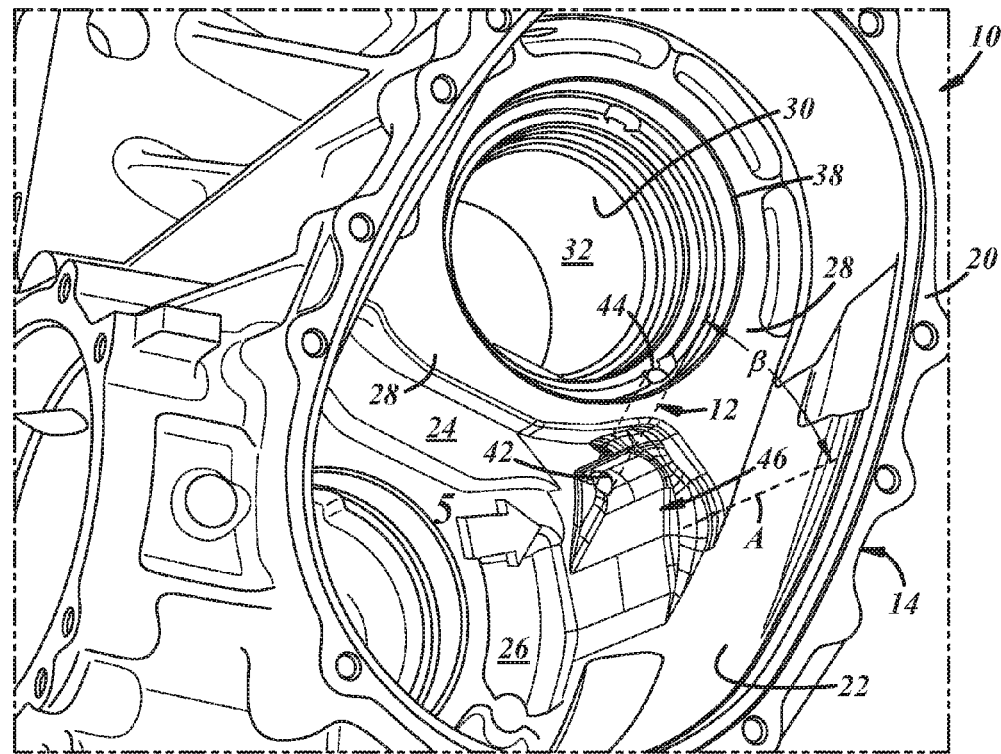
FIG. 4 is an enlarged view of an embodiment of an oil feed lead-in formation.

Referring now to FIGS. 2 and 4, the housing 14 also includes an interior wall 28. The interior wall 28 unitarily extends from the main wall 20 and supports a shaft that carries the second gear assembly 16 when the PTU 10 is assembled together. The interior wall 28 can have a generally circular and cylindrical conformation, as shown in the figures. As depicted in FIG. 1, the second gear assembly 16 generally sits above the first gear assembly 15 as their teeth mesh with one another in operation. At least a portion of the interior wall 28 is situated above the oil line A and above the oil resting plane. The interior wall 28 has an inner surface 30 that defines a second section 32 of the interior 24. The second section 32 is the space inside the interior wall 28 where, in this embodiment, the shaft of the second gear assembly 16 is received. The shaft passes through the second section 32 via an open end 38. The second section 32 constitutes a cavity defined by the interior wall 28. The interior wall 28 hence serves as a dividing wall extending within the interior 24 and partitioning the interior 24 into the first and second sections 26, 32 and into a cavity above the oil bath and a cavity that holds the oil bath.

Figure 6:
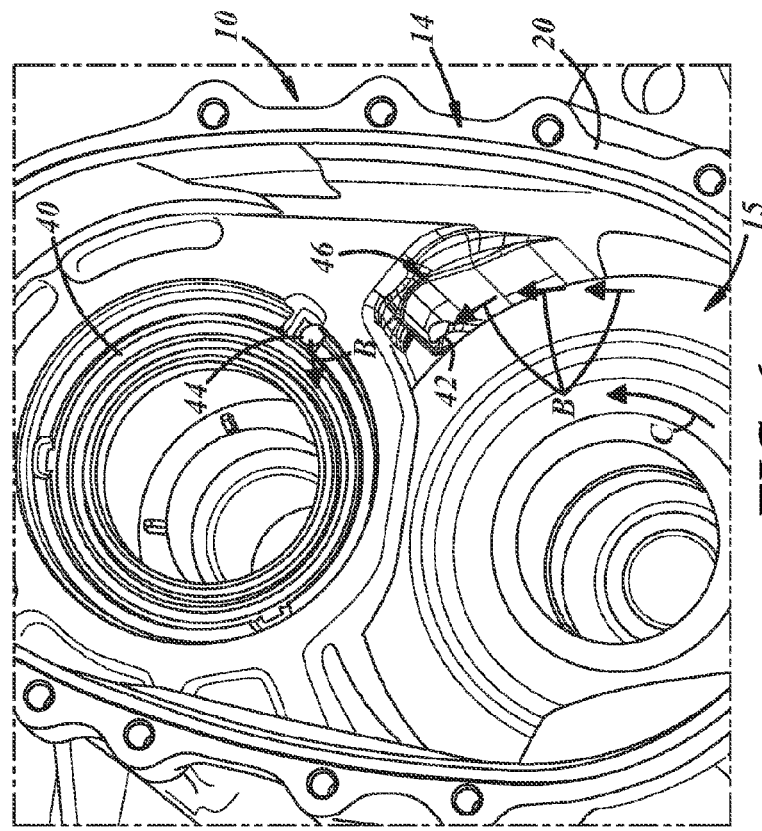
FIG. 6 is an enlarged view of the PTU housing of FIG. 1, illustrating some internal components.

Since the second section 32 is situated above the oil line A and above the oil resting plane, the second gear assembly 16 may not be fully submerged in the oil bath. The second section 32 may thus also not be submerged in the oil bath. In the past, despite their location outside of the oil bath, oil would make its way to a gear assembly and components above the oil bath as the oil was sloshed and splashed and slung around by a gear assembly immersed in the oil bath during operation. But in some cases—including in the embodiment shown in the figures—it has been found that oil does not always find its way to all parts of the second gear assembly 16 and its shaft, especially to those parts sitting within the second section 32 like bearings 40 (FIG. 6). And bearings and components not adequately lubricated have a shorter useful life. Without intending to be bound to specific theories of causation, it is currently believed that oil is precluded from parts of the second gear assembly 16 and its shall and bearings 40 due to the housing's architecture, due to the second section's location relative to the oil bath, and due to the interior wall 28 blocking oil from below.

To resolve these potential shortcomings and ensure that oil is properly supplied to desired parts of the second gear assembly 16 such as at the bearings 40, the housing 14 is furnished with the oil feed passage 12. In this particular embodiment, the oil feed passage 12 delivers oil from the first section 26 of the interior 24 and to the second section 32 as oil is thrown around by the first gear assembly 15 during operation of the PTU 10. The turbulent oil is urged—against gravity and without the use of an oil pump—through the oil feed passage 12 and hence to the second gear assembly 16 and to its shaft and to the bearings 40.

Figure 3:
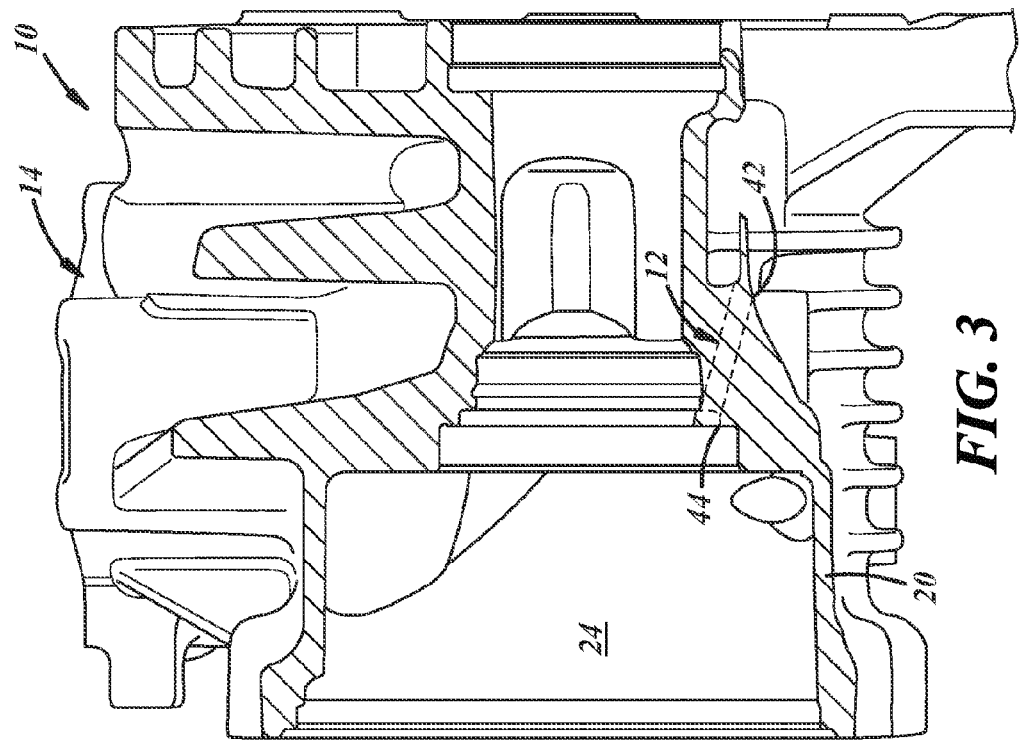
FIG. 3 is a partially sectioned view of the PTU housing of FIG. 1, illustrating an embodiment of an oil feed passage.

Referring to FIGS. 2-4, in this embodiment the oil feed passage 12 is an elongated cylindrical channel spanning between the first section 26 and the second section 32, and fluidly communicates with both of the sections. Here, the oil feed passage 12 has a geometrically linear extent and presents a direct path between the first and second sections 26, 32; in other words, the oil feed passage can present a straight line between the first and second sections 26, 32. Its linear extent can be oriented at an acute included angle $\beta$ relative to the oil resting plane. The orientation of the oil feed passage 12 relative to the oil resting plane in implementations as presented in the embodiment of the figures—its acute angle—has been found to readily deliver oil through the oil feed passage and to the second section 32. In other embodiments the oil feed passage 12 could take one or more turns throughout its length and could be at another angle, including a compound angle, relative to the oil resting plane. The oil feed passage 12 can be drilled into the housing 14, or could be formed via another metalworking process. In one specific example, the oil feed passage 12 is a cylindrical channel with a diameter of approximately 5.5 millimeters (mm); of course, in other examples other values are possible for the diameter, and other shapes and orientations are possible for the oil feed passage.

The oil feed passage 12 can extend through the main wall 20 of the housing 14, through the interior wall 28, or through both walls with one section of the passage in the main wall and another section in the interior wall. Still, the oil feed passage 12 could extend through another wall of another embodiment of a PTU housing. Exactly where the oil feed passage 12 extends may depend on the construction of the housing 14. In the embodiment of the figures, and referring particularly to FIG. 4, from the first section 26 to the second section 32 the oil feed passage 12 begins its extension at a lower portion of the interior wall 28 and terminates its extension at a higher portion of the interior wall.

The oil feed passage 12 has an inlet 42 at a first location open to the first section 26, and has an outlet 44 at a second location open to the second section 32. The inlet 42 is shown as being situated above the oil resting plane, but could be situated below the plane and within the oil bath. The outlet 44 is perhaps best shown in FIGS. 4 and 6 where it exits the interior wall 28 at a site in the second section 32 in which the bearings 40 are seated when the second gear assembly 16 and its shaft are set into place. In this way, oil leaving the outlet 44 is readily received by the bearings 40. In other embodiments, the outlet 44 could exit the interior wall 28 at other sites in the second section 32 depending on the desired location of oil relative to the second gear assembly 16 and to its shaft and components.

Figure 5:
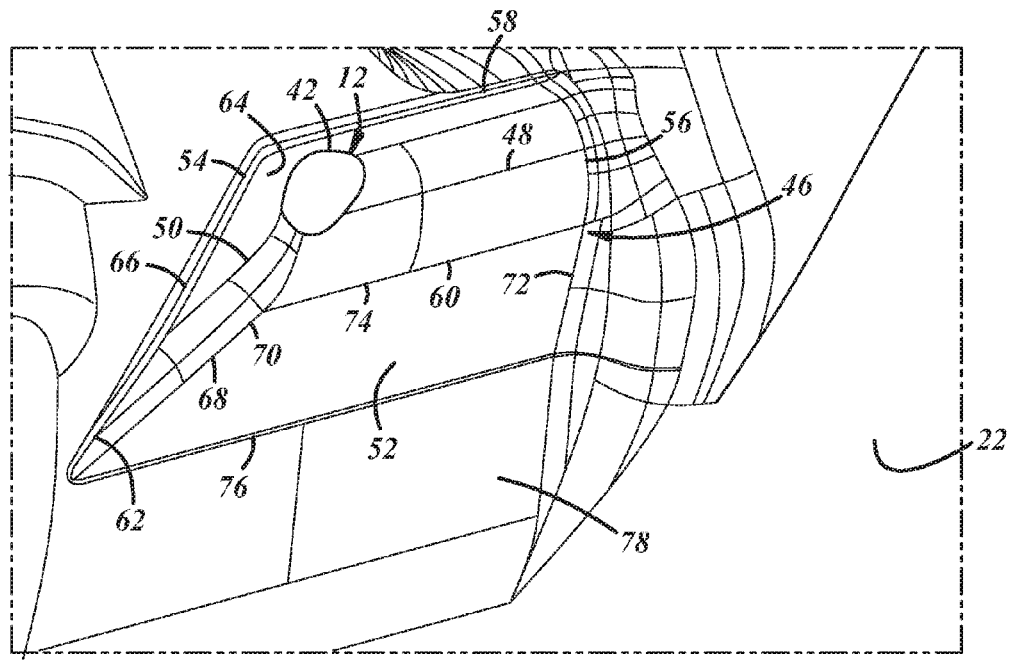
FIG. 5 is another enlarged view of the oil feed lead-in formation of FIG. 4.

Referring now to FIGS. 4 and 5, in this embodiment the housing 14 has an oil feed lead-in formation 46. The oil feed lead-in formation 46 need not be provided in all embodiments of the housing 14. When provided, the oil feed lead-in formation 46 helps guide turbulent oil impinging and hitting it to the inlet 42 and into the oil feed passage 12. The oil feed lead-in formation 46 is a wait depression that is located near the inlet 42, and is shaped so that oil is directed into the oil feed passage 12 via the inlet instead of simply passing over the inlet and avoiding entry into the oil feed passage. In this way, more oil can be delivered through the oil feed passage 12 than may otherwise be the case. The oil feed lead-in formation 46 can have different designs and constructions depending upon, among other possible factors, its location in a housing wall and its location with respect to the oil bath and with respect to turbulent oil. In the embodiment of FIGS. 4 and 5, the oil feed lead-in formation 46 is set in an underside of the interior wall 28 and spans just about to the main wall 20. In other embodiments, the oil feed lead-in formation 46 could be set only in the interior wall 28 or only in the main wall 20—its location may be dictated by the location of the inlet 42 and the motion and movement of the turbulent and thrown oil. In the figures, the oil feed lead-in formation 46 is situated above the oil line A and above the oil resting plane. The inlet 42 is located within the confines of the oil feed lead-in formation 46.

The oil feed lead-in formation 46 can be made up of various surfaces that together steer thrown oil toward the inlet 42, or the oil feed lead-in formation can be made of a single surface shaped to steer thrown oil toward the inlet. In the embodiment presented in the figures, and particularly referring to FIG. 5, the oil feed lead-in formation 46 has a first curved surface 48, a second curved surface 50, and a flat surface 52. The surfaces 48, 50, 52 span from one another and intersect one another. The first curved surface 48 immediately surrounds a portion of the periphery of the inlet 42. The first curved surface 48 has a concave shape and is orientated to generally confront the oil resting plane of the oil bath. Still, in other embodiments, the first curved surface 48 could be made up of numerous smaller planar surfaces angled relative to one another that together generally resemble and serve as a curved surface. In one specific example, its concavity has a radius of approximately 8.0 mm; of course, in other examples other values for the radius are possible. The first curved surface 48 spans longitudinally between a first end 54 and a second end 56—its longitudinal extent overlaps the inlet 42. In one specific example, between the first and second ends 54, 56, the first curved surface 48 has a length of approximately 40.0 mm; of course, in other examples other values for the length are possible. And the first curved surface 48 spans transversely between a top edge 58 and a bottom edge 60—again its transverse extent overlaps the inlet 42.

Still referring to FIG. 5, in this embodiment the second curved surface 50 also has a concave shape, but is orientated differently than the first curved surface 48. Its longitudinal extent is arranged at an acute angle relative to the longitudinal extent of the first curved surface 48. In other embodiments, the second curved surface 50 could be made up of numerous smaller planar surfaces angled relative to one another that together generally resemble and serve as a curved surface. The second curved surface 50 spans longitudinally between a first end 62 and a second end 64. The second end 64 intersects with a portion of the periphery of the inlet 42. The second end 64 is wider than the first end 62, as the second curved surface 50 narrows transversely from the second end 64 and toward the first end. In one specific example, between the first and second ends 62, 64, the second curved surface 50 has a length of approximately 38.7 mm; of course, in other examples other values for the length are possible. Further, the second curved surface 50 spans transversely between a first edge 66 and a second edge 68.

Lastly, the flat surface 52 has a generally planar shape and is generally level across its extent. In the embodiment of FIG. 5, the flat surface 52 spans from both of the first and second curved surfaces 48, 50 and shares an end and an edge with the curved surfaces. The flat surface 52 spans longitudinally between a first end 70 and a second end 72, and spans transversely between a top edge 74 and a bottom edge 76. Unlike the first and second curved surfaces 48, 50, the area defined by the flat surface 52 does not overlap the inlet 42. In one specific example, between the first and second ends 70, 72 and at the bottom edge 76, the flat surface 52 has a length of approximately 69.0 mm; of course, in other examples other values for the length are possible. Furthermore, in this embodiment, an inclined or tapered surface 78 spans transversely from the bottom edge 76 of the flat surface 52 and merges into the inner surface 22 of the main wall 20.

Depending on its design and construction, the oil feed lead-in formation 46 can be produced as part of the housing's casting process. With casting, the oil feed lead-in formation 46 can be fashioned it the main wall 20 or in the interior wall 28 to facilitate the manufacturing process by, for instance, creating a tapered transition between the oil feed lead-in formation and adjacent wall. Still, in another manufacturing process, the oil feed lead-in formation 46 could be machined into the main wall 20, into the interior wall 28, or into both walls.

Referring back to FIG. 1, the first gear assembly 15 is interconnected to a shaft, and is set in the interior 24 at the first section 26 where it is partly or more submerged in the oil bath. In one example the first gear assembly 15 is a ring gear assembly, but could be a spur gear, beveled gear, hypoid gear, helical gear, or another gear type.

The second gear assembly 16 is interconnected to a shaft, and is set in place at one end at the second section 32. As described earlier, the second gear assembly 16 could sit mostly above the oil resting plane and above the oil bath. In one example the second gear assembly 16 is a helical gear assembly, but could be a spur gear, beveled gear, hypoid gear, ring gear, or another gear type. Referring now to FIG. 6, the bearings 40 could be ball bearings, needle bearings, roller bearings, thrust bearings, angular ball bearings, tapered roller bearings, thrust needle roller bearings, or another bearing type. The bearings 40 can be an integral part of the second gear assembly 16, or could be a discrete part. A seat defined in the interior wall 28 at the second section 32 receives the bearings 40 in assembly and in installation. The seat can be a circular groove defined in the inner surface 30.

Referring now to FIG. 6, during operation as the first and second gear assemblies 15, 16 rotate, the first gear assembly can cause sloshing and splashing of the oil in the oil bath, and can sling the oil around the interior 24. The resulting turbulent and thrown oil can be raised above the oil line A, and can impinge the oil feed lead-in formation 46 in which case it would be guided toward the inlet 42. The oil is then urged through the oil feed passage 12 and to the second gear assembly 16 and to the bearings 40. The route taken by the oil described here is represented by the arrows B in FIG. 6;

still, other routes are possible. Further, arrow C depicts the rotation direction of the first gear assembly 15. With this rotation direction, the turbulent and thrown oil may be more readily directed toward the oil feed passage 12, and the oil feed lead-in formation 46 can be located in a position to guide the turbulent and thrown oil according to this rotation direction, as shown in FIG. 6.

While the oil feed passage has been depicted in one example PTU housing, it is intended that the oil feed passage could be employed in other examples. Indeed, the oil feed passage could be useful in PTU housings where oil is precluded from effectively making its way to gear assemblies and bearings suspended above the oil, or here oil is not otherwise accessible to the gear assemblies and bearings.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A vehicle power transfer unit (PTU) housing, comprising:
    at least one wall defining at least part of an interior;
    an oil feed passage extending through said at least one wall, said oil feed passage having an inlet open to said interior at a first location and having an outlet open to said interior at a second location situated above said first location and above an oil resting plane of an oil bath held in the power transfer unit (PTU) housing, wherein, upon operation of a gear assembly in said interior, oil of said oil bath is urged through said oil feed passage from said inlet to said outlet and to said second location; and
    an oil feed lead-in formation in said at least one wall and located adjacent said inlet of said oil feed passage, said oil feed lead-in formation shaped and oriented relative to the oil resting plane of the oil bath in order to guide some of said oil into said oil feed passage upon operation of the gear assembly in said interior.

2. A vehicle power transfer unit (PTU) housing as set forth in claim 1, wherein said oil feed passage extends through an interior wall of the power transfer unit (PTU) housing, through a main wall of the power transfer unit (PTU) housing, or through both said interior wall and said main wall of the power transfer unit (PTU) housing.

3. A vehicle power transfer unit (PTU) housing as set forth in claim 1, wherein said interior has a first section in which the oil bath is held in the power transfer unit (PTU) housing and has a second section defined in part by an interior wall of the power transfer unit (PTU) housing, said second section situated above said first section, said inlet of said oil feed passage open to said first section and said outlet of said oil feed passage open to said second section.

4. A vehicle power transfer unit (PTU) housing as set forth in claim 1, wherein said oil feed passage is oriented at an acute angle relative to the oil resting plane.

5. A vehicle power transfer unit (PTU) housing as set forth in claim 1, wherein said oil feed passage has a geometrically linear extent between said inlet and said outlet, and said oil feed passage lacks a change-of-direction along the geometrically linear extent between said inlet and said outlet.

6. A vehicle power transfer unit (PTU) housing as set forth in claim 1, wherein the second location is adjacent a bearing of a second gear assembly and oil exiting said outlet lubricates the bearing of the second gear assembly.

7. A vehicle power transfer unit (PTU) housing as set forth in claim 1, wherein said oil feed lead-in formation includes at least one curved surface that confronts said oil bath.

8. A vehicle power transfer unit (PTU) housing as set forth in claim 7, wherein said oil feed lead-in formation includes at least one flat surface, said at least one flat surface spanning from said at least one curved surface, said at least one curved surface surrounding at least a portion of a periphery of said inlet and said at least one flat surface spaced from said inlet.

9. A vehicle power transfer unit (PTU) housing as set forth in claim 1, wherein said oil feed lead-in formation includes a first curved surface and a second curved surface, at least one of said first or second curved surfaces confronting said oil bath, said first curved surface surrounding a first portion of a periphery of said inlet, said second curved surface surrounding a second portion of said periphery of said inlet.

10. A vehicle power transfer unit (PTU) housing as set forth in claim 9, wherein said first and second curved surfaces intersect each other, and said inlet of said oil feed passage is located adjacent the intersection of said first and second curved surfaces.

11. A vehicle power transfer unit (PTU) housing as set forth in claim 1, wherein said at least one wall includes a main wall and an interior wall, said main wall has an inner surface that partly defines said interior, said interior wall extends from said main wall at said interior, said oil feed passage extends through said interior wall and said inlet is located at said interior wall and said outlet is located at said interior wall.

12. A vehicle power transfer unit (PTU) housing as set forth in claim 11, wherein said inner surface of said main wall defines a first section of said interior in which the oil bath is held in the power transfer unit (PTU) housing, an inner surface of said interior wall defines a second section of said interior and has a seat for receiving bearings, said second section situated above the oil resting plane of the oil bath, said inlet of said oil feed passage open to said first section, said outlet of said oil feed passage open to said second section and located at said seat.

13. A vehicle power transfer unit (PTU) housing, comprising:
    a main wall;
    an interior wall extending from said main wall;
    an interior having a first section in which an oil bath is held in the power transfer unit (PTU) housing, said first section defined at least in part by an inner surface of said main wall, said interior having a second section situated above an oil resting plane of said oil bath, said second section defined at least in part by an inner surface of said interior wall;
    an oil feed passage extending through said interior wall, said oil feed passage having an inlet open to said first section and having an outlet above said inlet and open to said second section; and
    an oil feed lead-in formation set at least partly in said interior wall adjacent said inlet of said oil feed passage.

14. A vehicle power transfer unit (PTU) housing as set forth in claim 13, wherein said oil feed lead-in formation includes at least one curved surface located adjacent said inlet of said oil feed passage.

15. A vehicle power transfer unit (PTU) housing as set forth in claim 14, wherein said oil feed lead-in formation includes at least one flat surface located adjacent said inlet of said oil feed passage.

16. A vehicle power transfer unit (PTU) housing as set forth claim 15, wherein said at least one curved surface and said at least one flat surface are orientated with respect to each other and with respect to the oil resting plane of said oil bath in order to guide oil from said oil bath into said oil feed passage upon operation of a gear assembly in said interior.

17. A vehicle power transfer unit (PTU) housing as set forth in claim 15, wherein said at least one curved surface includes a first curved surface and a second curved surface, said at least one flat surface includes a single flat surface, and said first and second curved surfaces and said single flat surface are orientated with respect to said inlet of said oil feed passage in order to guide oil from said oil bath into said oil feed passage upon operation of a gear assembly in said interior.

18. A vehicle power transfer unit (PTU) assembly, comprising:
   a housing including:
   a main wall;
   an interior wall extending from said main wall;
   a first interior section defined at least in part by an inner surface of said main wall, said first interior section holding an oil bath;
   a second interior section defined at least in part by an inner-surface of said interior wall, said second interior section situated outside of said oil bath;
   an oil feed passage extending through said main wall, through said interior wall, or through both said main wall and said interior wall, said oil feed passage having an inlet open to said first interior section and having an outlet above said inlet and open to said second interior section, said oil feed passage fluidly communicating said first interior section with said second interior section; and
   an oil feed lead-in formation set in said main wall, set in said interior wall, or set in both said main wall and said interior wall, said oil feed lead-in formation located adjacent said inlet of said oil feed passage, said oil feed lead-in formation having at least one curved surface and at least one flat surface spanning from said at least one curved surface;
   a gear assembly located at said first interior section; and
   at least one bearing located at said second interior section;
   wherein, amid operation of said gear assembly at said first interior section, oil of said oil bath impinges said oil feed lead-in formation and is urged through said oil feed passage from said inlet to said outlet and to said at least one bearing.

* * * * *